Oct. 1, 1940.   M. K. SELLERS   2,216,138
CONTROL FOR PREVENTING SKIDDING OF AUTOMOBILES
Filed May 1, 1935   3 Sheets-Sheet 1
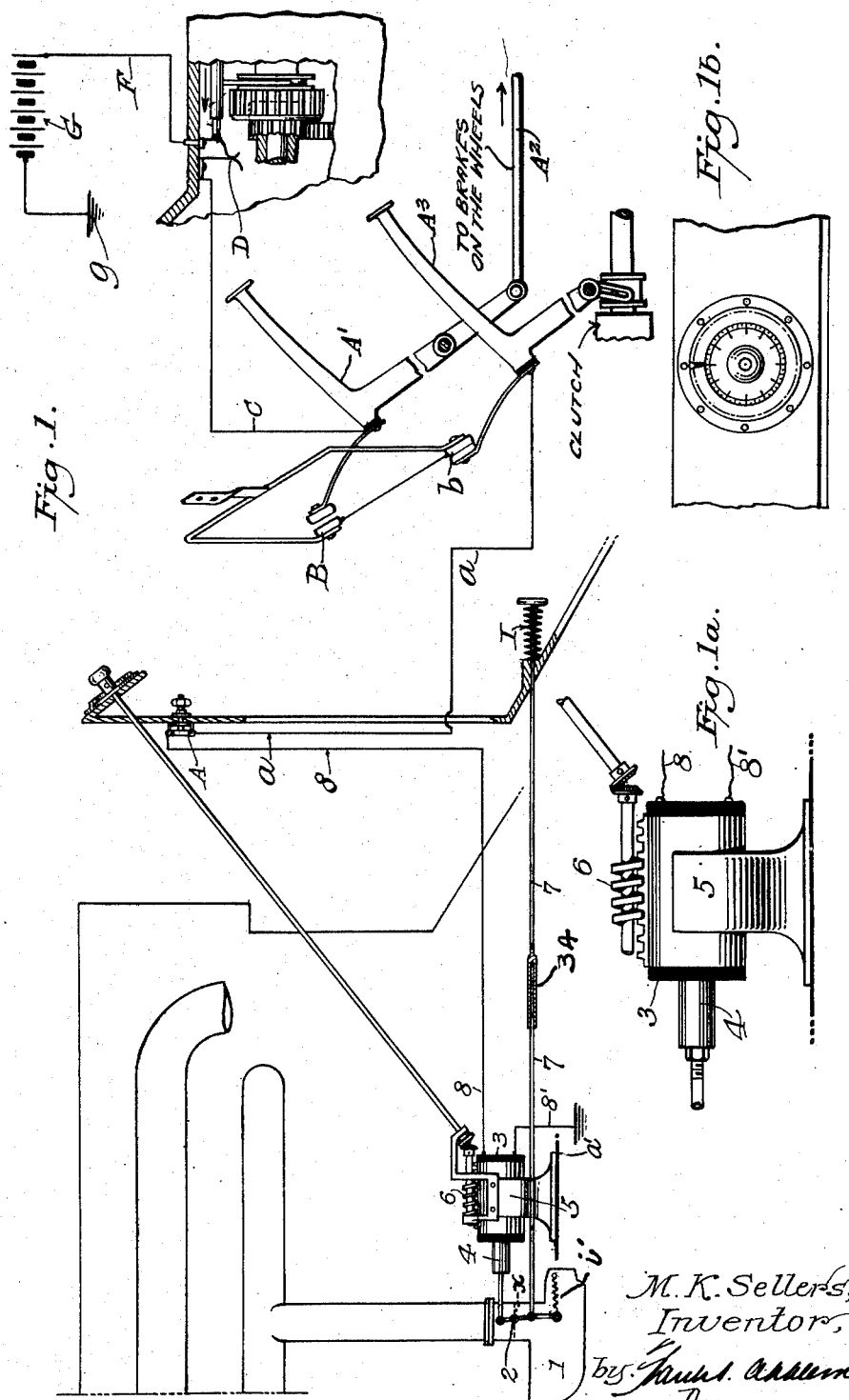
M. K. Sellers,
Inventor,
Attorney.

Oct. 1, 1940.     M. K. SELLERS     2,216,138
CONTROL FOR PREVENTING SKIDDING OF AUTOMOBILES
Filed May 1, 1935     3 Sheets-Sheet 2
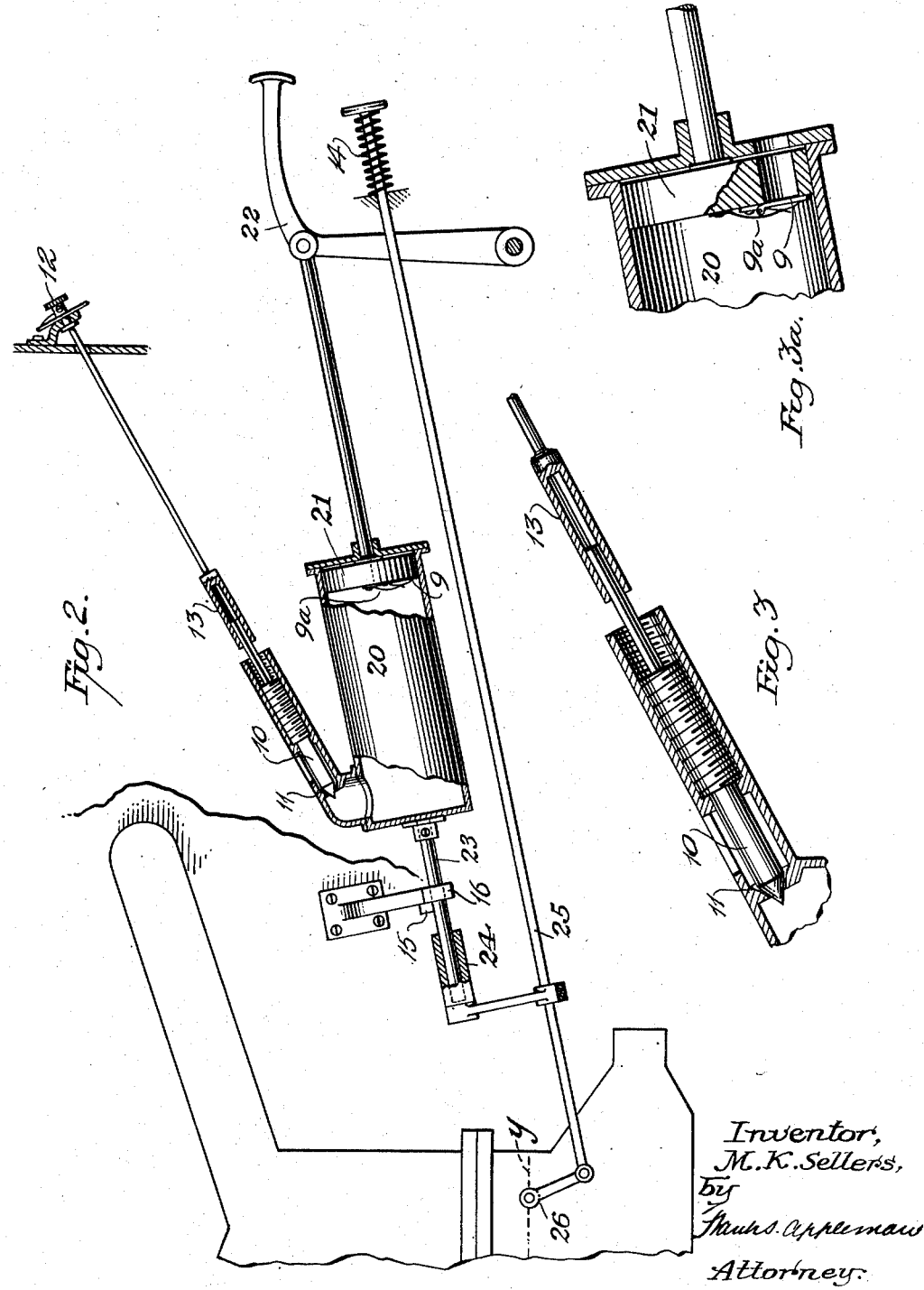

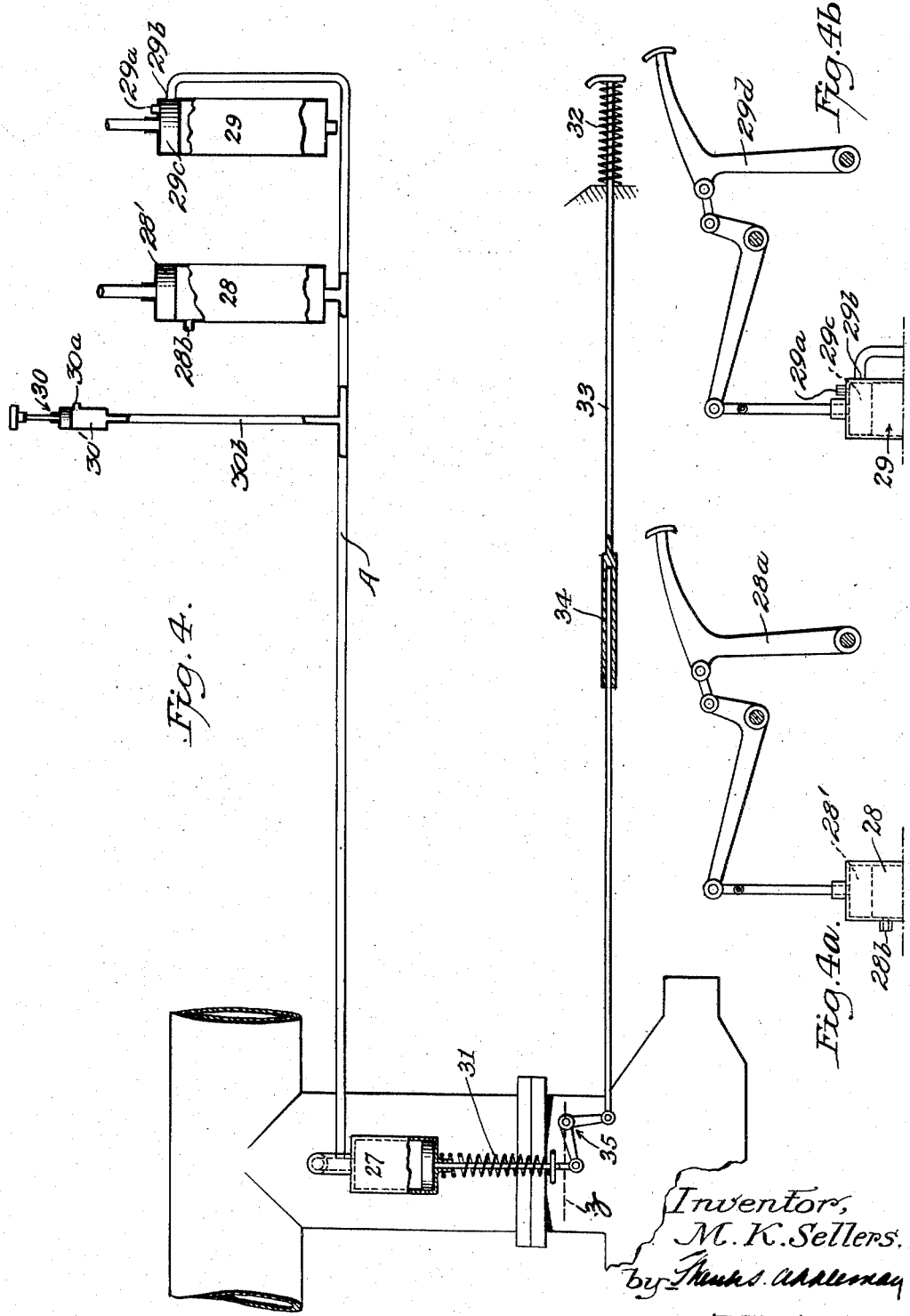

Patented Oct. 1, 1940

2,216,138

UNITED STATES PATENT OFFICE 2,216,138

CONTROL FOR PREVENTING SKIDDING OF AUTOMOBILES

Max Kenneth Sellers, Cornish, N. H.

Application May 1, 1935, Serial No. 19,328

8 Claims. (Cl. 192—.01)

This invention relates to controls for preventing skidding when automobiles are under the influence of their brakes and the object of the invention is to apply controlled power from the motor to the rear wheels during the act of braking, which will provide more efficient braking on slippery surfaces by preventing the sudden locking of the brakes and will also, by applying sufficient forward traction by the rear wheels during the braking interval, eliminate any tendency of the car to skid laterally.

It is a further object of the invention to provide means for controlling the fuel feed of an engine of an automobile in certain relation to the movement of the braking mechanism and to prevent choking of the engine as the brakes are applied and also to prevent the manual fuel control from being operated so that the power of the engine will be cut off at a time when the rotation of the wheels of the automobile is dangerously impeded.

It is furthermore an object of the invention to provide electrically operated or mechanically operated controls for the throttle valve of an internal combustion engine, the primary object of which is to open or close the said throttle valve proportional to the braking action of the wheels of an automobile, the movement of brake operating mechanisms, or of the actuation of the manually operated means.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a diagrammatic view of a system for carrying the invention into effect, including associated mechanism;

Figure 1ª illustrates an enlarged detail view in side elevation of a solenoid and parts associated therewith;

Figure 1ᵇ illustrates a view in elevation of the face of a dial and an operating handle associated therewith;

Figure 2 illustrates a view in elevation, partly in section, of a modified embodiment of the invention;

Figure 3 illustrates an enlarged sectional detail;

Figure 3ª illustrates an enlarged sectional view of a cylinder and a valve piston associated therewith;

Figure 4 illustrates a view in elevation of a modified embodiment of the invention;

Figure 4ª illustrates a view in side elevation of a brake pedal and its association with an air controlling part of the embodiment of the invention shown in Figure 4; and Figure 4ᵇ illustrates a similar view of a clutch pedal and its association with an air controlling part of the embodiment of the invention shown in Figure 4.

In carrying the invention into practice, a carburetor 1 is associated with a throttle valve $x$ on a shaft 2 in any of the well known assemblies and the throttle valve is operated by a solenoid 3 whose core 4 is connected to the throttle valve.

The strength of the solenoid is determined by a circuit controlling means in order that the solenoid will move the throttle valve predetermined distances and hold it temporarily in the different positions of adjustment.

The solenoid has conductors 8 and 8', the former of which is connected through a switch A, conductor $a$, and a circuit including the switches B, $b$, conductor C, switch D, conductor F and to the battery G. The battery G is grounded as at $g$ and the conductor 8' is grounded so that through the several conductors and switches, the solenoid is energized when the brake pedal and the clutch pedal are operated. The switch D is operated to closed position when the usual gear shift lever is in high gear position only, and the said switch D is opened when the gear shift lever is in other positions.

The brake pedal A' is provided with the usual brake connecting rod A² and the clutch lever A³ is connected to any conventional type of clutch.

It is the purpose of the inventor to have the circuit and switches so arranged that contacts or switches are provided, one B to be operated by the movement of the brake pedal and the other $b$ to be operated by the movement of the clutch pedal. The contact B operated by the brake pedal is normally open and the contact $b$ operated by the clutch pedal is normally closed, and when the brake pedal is operated to close the circuit and energize the solenoid the clutch is kept engaged and of course the power developed by the increased acceleration is transmitted to the driven wheels.

When the solenoid is deenergized, the throttle valve is under control of a spring I of the accelerator rod 7 which may be connected to the throttle valve in known manner.

The distance to which the throttle valve 2 will be opened will depend upon the relative distance between the center of the coil of the solenoid 3 and the center of the solenoid core 4 before the solenoid is energized.

The solenoid may, of course, be mounted in suitable manner, as by a bracket 5 secured in convenient position on the motor block a' or at other appropriate location.

The solenoid is free to move within the bracket 5 and its position may be shifted for changing the relative distance between the center of the coil of the solenoid 3 and the core 4. The shifting operation is effected by a worm gear 6 connected to a hand control which may be appropriately calibrated to insure accuracy of adjustment and result.

It will be apparent from the illustration and from the foregoing description that when the brake pedal is moved to apply the brakes, a circuit will be established through the solenoid and that the throttle valve will be opened so that the wheels of the automobile will have power transmitted to them which will defeat any tendency of the brakes to lock or of inertia to change the course of the car travel.

Figure 2 shows the installation of one embodiment of mechanical means for controlling the throttle valve and consists of a metal cylinder 20 with a ground-in piston 21, the shaft of which is connected to a brake pedal 22. An extension 23 of the cylinder is connected by a sliding joint 24 to the extension of the accelerator rod 25 which, in turn, is connected to the throttle of the carburetor as usual.

The piston 21 has one large port which is covered by a tightly fitting check valve 9 which is held in place by a small spring, 9ª. The check valve remains closed at all times except on the up-stroke of the piston 21 when it opens to admit air to the cylinder 20, closing again as the piston comes to rest.

In the lower end of the cylinder 20 is a large port 11 into which is fitted a needle valve 10 which can be adjusted from the dash by the calibrated knob 12 so that the port may be opened entirely or closed to a predetermined extent. When the port is fully open, no compression is allowed in the cylinder 20 and the throttle control remains inactive. In use, the rapidity of the action of the throttle control will depend upon the extent to which the port 11 is closed. The needle valve is so stopped that it is impossible to entirely close the port 11 at any time. The shaft of the needle valve which fits into the sleeve 13 is square, as is the sleeve. This allows the knob 12 to turn the valve and at the same time allows the shaft to slide within the sleeve as the control acts, as will be explained later.

In operation, the port 11 is closed by the calibrated knob 12 to an extent which, as has been previously determined, will allow the control to act for a sufficient time to accomplish its purpose at the average speed at which the automobile is being driven. The piston 21 is fully cocked, as shown, and remains so as long as the brake pedal is at rest.

When the operator wishes to stop, he releases the accelerator and depresses the brake pedal, leaving the clutch engaged. As the brake pedal moves, the piston 21 is forced into the cylinder 20, but since the port 11 is open to only a small extent, the air within the cylinder is partially compressed and the whole control moves forward, carrying with it the accelerator rod 25, which in turn opens the throttle 26. Since the clutch remains engaged, power is transmitted to the rear wheels, with results heretofore explained.

The air in the cylinder 20 meanwhile has been rushing out of the port 11 and the cylinder 20 is gradually forced back upon the piston 21 by the pressure of the accelerator springs 14, thus allowing the throttle 26 to return to idling position. As the brake pedal is released, a stop 15 on the cylinder extension 23 engages with a hanger 16, holding the cylinder so that the piston can be returned to its original position.

Regulation of duration of the open throttle will depend upon the size of the opening afforded at the port 11, and regulation of the amount which the throttle is opened will depend upon how far the brake pedal is depressed. These two means of regulation afford a fineness of control which will meet almost any driving condition.

At excessive speeds, if an unusual amount of braking control is necessary, a momentary release of the brake pedal re-cocks the piston and allows the action to be repeated.

In Figure 4, the principle of controlling the throttle is associated with a vacuum control. The mechanism there shown consists of a cylinder 27 which is tapped into the intake manifold, the piston of which is attached through its shaft to the throttle 35 of the carburetor.

A pipe A is in communication with a cylinder 28 and a cylinder 29. The cylinder 28 has a piston 28' which is operative, upon actuation, to close a port 28ᵇ in said cylinder which port communicates with the atmosphere. The cylinder 29 is provided with a port 29ª leading to the atmosphere and an extension of the pipe A connects with the cylinder 29 at 29ᵇ. A piston 29ᶜ controls the passage of air in the cylinder 29 through the port 29ª and the pipe A. The cylinder is open at its bottom in order that the piston may move freely therein without compression, and when said piston 29ᶜ is forced inwardly by the operation of a clutch pedal 29ᵈ which is connected to the piston by suitable linkage, the pipe A communicates with the atmosphere through the port 29ª of the cylinder 29. A hand operated valve 30 in a cylinder 30' controls a port 30ª of the cylinder and the cylinder is connected to the pipe A by a branch pipe 30ᵇ. The piston 28' is intended to close the open port 28ᵇ when a brake pedal 28ª connected to it by suitable linkage is operated to force the piston 28' inwardly. If, at the same time, the port 30ª is closed, a vacuum is created in the cylinder 27 which operates the throttle of the intake manifold and increases the fuel supply to the engine, and this continues so long as the said ports are closed. When the said ports 28ᵇ and 30ª are opened, air is drawn through the piping to the intake manifold and no vacuum can be built up and the cylinder 27 remains inactive.

In operation, as has been stated, the valve 30 is closed from the dash, and air is drawn through the open port of the cylinder 28. When the driver wishes to stop, the clutch is allowed to remain in engagement and the brake pedal is depressed, causing the open port of the cylinder 28ᵇ to be closed. The vacuum of the intake manifold immediately becomes operative and the piston of the cylinder 27 is drawn in and the throttle of the carburetor is moved to open position, transmitting power to the rear wheels with the result heretofore explained. When the speed of the automobile has dropped sufficiently the clutch pedal is depressed, opening communication between the port 29ª and the pipe A at 29ᵇ to permit air to enter the pipe A of the cylinder 27 to release the vacuum. A coiled spring 31 on the piston shaft of the cylinder 27 causes the return of the throttle to its idling position.

In order that the vacuum need not overcome the strong pull of the springs 32 on the accelerator rod 33, a sliding joint 34 is incorporated as shown.

While the functions of the different illustrated parts of the invention have been generally stated in connection with the description of the parts and their relations to other parts, the following resume of the objects and operation will aid in a more complete understanding of the invention by one skilled in the art.

The action of the device is based upon the fact that the continued application of power from the motor to the rear wheels during the act of braking will accomplish two definite objects:

1. That such continued application of power, in suitable quantity, will prevent any sudden locking of the brakes, with consequent stopping of the revolution of the wheels.

2. That such continuous application of power to the rear wheels, in correct amount, will overcome any tendency of inertia to propel the car in any direction other than that desired by the operator.

It is axiomatic among brake engineers that "rolling" friction developed by the brake lining being in contact with the revolving brake drums, is more efficient than "sliding" friction, or that developed between the sliding tire and the road surface when the wheels are stopped by "locking" the brakes. In the conventional automobile braking system, the potential braking power is much greater than ever comes into actual use. At a certain point during the act of braking before the full amount of potential power is exerted the linings grip the drums so tightly that their friction becomes greater in amount than the friction between the tires and the road surface. The wheels are stopped and the tires slide until the car comes to a stop. At ordinary speeds, on normal road surfaces, this waste of potential power is not appreciable and the system reaches its highest efficiency. On slippery surfaces, however, a much smaller amount of the total possible amount of braking power is necessary to stop the revolution of the wheels and the loss of unused potential is so great that the system reaches the minimum of efficiency. At high speeds, on normal road surfaces, it is possible to apply a much higher percentage of the power inherent in the braking system but it is still possible to lock the brakes and slide the wheels before the maximum force has been applied. The danger in this instance comes from the terrific strain imposed upon the tires when they are made to slide on the dry road surface. A weak tire blows out under such conditions.

Coincident with the loss of potential braking power when the revolution of the wheels is suddenly stopped by locking the brakes is the loss of the factor popularly known as "braking on compression" or "braking on the motor." Under ordinary conditions, when the wheels are not stopped when the brakes are applied, the motor is made to absorb a certain amount of the inertia which is driving the car forward. As the operator moves his foot from the accelerator, to the brake petal, the accelerator spring closes the throttle and the motor tends to drop to idling speed. The clutch is allowed to remain engaged. Since the wheels are now traveling faster than the motor, the usual transmission of power from the motor to the rear wheels is reversed. Some of the inertia which is driving the car forward is transmitted through the rear wheels, drive shaft and clutch and is expended harmlessly in turning over the idling motor. If the wheels have been locked by the brakes this cannot take place for the drive shaft and clutch are likewise immobile.

This invention since it provides against a sudden locking of the brakes brings about an adjustment between the forces of potential braking power and braking "on compression" and so balances the one against the other as to produce a maximum of braking efficiency.

Another purpose accomplished by the invention is that of overcoming the tendency of inertia to propel the car in any direction other than that desired by the operator. Inertia can not act to produce a lateral skid unless it exceeds in amount the power which is acting through the rear wheels to propel the car forward. On a dry road surface, the amount of friction between the tires and the road surface is so great that inertia has little or no chance to produce lateral movement of the car as a whole. On slippery roads, however, tire friction is materially less and any sudden change of direction in the car's travel will invite a skid. Inertia is defined as "that property by virtue of which a body, if in motion, tends to continue in motion in the same straight line unless acted upon by some external force." It is obvious that skidding, the result of the action of inertia can be dispensed with if sufficient force can be applied to overcome the inertia. Tire chains, the object of which is of course to increase the friction between the tire and the road surface are, at their best only of negative help. With the present invention there is assurance that the operator will retain absolute control of the car's direction of progress.

It is possible also to overcome or modify the skidding action of an automobile which starts before any braking influence has been exerted on the wheels and this can be done by depressing the brake pedal to slow the speed and at the same time furnish power to the rear wheels by means of which the skid can be modified or controlled.

The throttles are shown in their closed positions in Figs. 1, 2 and 4 and are provided with reference characters $x$, $y$ and $z$, respectively.

I claim:

1. In a control for preventing skidding of automobiles having a power controllable engine, a braking instrumentality for retarding traction wheels of the automobile, a manually operated means for operating the braking instrumentality, means associated therewith for operating the power control of the engine, means associated therewith for increasing the power of the engine in certain relation to the aforesaid braking action, and means to adjustably regulate said relation.

2. In a control for preventing skidding of automobiles, brake operating mechanism, a clutch device, an explosive engine having a fuel feed, means activated by the movement of brake operating mechanism for maintaining the supply of fuel in accordance with the increasing of the braking operation of the brake operating mechanism, and means actuated by movement of the clutch device to release the clutch for effecting release of the last mentioned means.

3. In a control for preventing skidding of automobiles, a brake operating mechanism, means connected to an intake manifold of an internal combustion engine, a pipe connected thereto and to the atmosphere, means therein operated by the suction of the engine, a throttle control operated by the movement of the last mentioned means, and means controlled by the movement of the brake operating mechanism for controlling the circulation of air in the pipe, the relation of parts being such that fuel is supplied to the engine to develop forward traction in driving wheels of the automobile during braking of the automobile in ratio to the speed of the automobile.

4. In a control for preventing skidding of automobiles, a brake operating mechanism, means connected to an intake manifold of an internal combustion engine, a pipe connected thereto and to the atmosphere, means therein operated by the suction of the engine, a throttle control operated by the movement of the last mentioned means, means controlled by the movement of the brake operating mechanism for controlling the circulation of air in the pipe, and a manually operated device for operating the fuel control associated with means to permit the fuel control to move independently of the manually operated fuel control, the relation of parts being such that fuel is supplied to the engine to develop forward traction in driving wheels of the automobile during braking of the automobile in ratio to the speed of the automobile.

5. In a control for preventing skidding of automobiles having a power controllable engine, a brake operating mechanism for retarding traction wheels of the automobile, means for controlling the fuel supply of the engine, an air compressing mechanism movably connected to the fuel control, means for connecting the air compressing mechanism to the brake operating means, and means for regulating the compression of air in the said air compressing mechanism.

6. In a control for preventing skidding of automobiles having a power controllable engine, a brake operating mechanism for retarding traction wheels of an automobile, means for controlling the fuel supply of the engine, an air compressing mechanism movably connected to the fuel controlling means and to the brake operating means, means for regulating the compression of air in the said air compressing mechanism, manually operated means for actuating the means for controlling the fuel supply, and means whereby the said manually operated control moves independently of the compressor.

7. In a control for preventing skidding of automobiles, an engine having a throttle, a solenoid having a core connected to the throttle, a circuit for energizing the solenoid, means for holding the solenoid in different positions of adjustment with relation to the throttle, a brake applying mechanism, a clutch operating mechanism, a gear shift, an electric conductor, an electric switch actuated by the gear shift connected to the conductor, a conductor from the switch included in the circuit for energizing the solenoid and switches in the circuit one of which is actuated by the brake operating mechanism and the other of which is actuated by the clutch operating mechanism.

8. In a control for preventing skidding of a vehicle impelled by an internal combustion engine, means for decelerating the vehicle, and means controlled by the decelating means to accelerate the engine including a lever for supplying a combustible fluid to the engine to develop forward traction to wheels thereof during the braking, the arrangement being such that the forward traction is in ratio to the speed of the vehicle.

MAX KENNETH SELLERS.